US012627693B2

(12) United States Patent
Ahn et al.

(10) Patent No.:  US 12,627,693 B2
(45) Date of Patent:  May 12, 2026

(54) CYBER-ATTACK TRACKING METHOD AND DEVICE USING BEHAVIOR EVENT-BASED RELATIONSHIP DATA COLLECTED FROM MULTIPLE DOMAINS, AND STORAGE MEDIUM STORING INSTRUCTIONS TO PERFORM CYBER-ATTACK TRACKING METHOD

(71) Applicant: AGENCY FOR DEFENSE DEVELOPMENT, Daejeon (KR)

(72) Inventors: JaeHong Ahn, Daejeon (KR); Chanil Park, Daejeon (KR); Minsang Lee, Daejeon (KR); Taehyung Kim, Daejeon (KR); Hyun Yu, Daejeon (KR)

(73) Assignee: Agency for Defense Development, Daejeon (KR)

( * ) Notice: Subject to any disclaimer, the term of this patent is extended or adjusted under 35 U.S.C. 154(b) by 106 days.

(21) Appl. No.: 18/671,248

(22) Filed: May 22, 2024

(65) Prior Publication Data

US 2025/0150475 A1    May 8, 2025

(30) Foreign Application Priority Data

Nov. 6, 2023    (KR) ........................ 10-2023-0152071

(51) Int. Cl.
*H04L 9/40* (2022.01)
(52) U.S. Cl.
CPC ...... *H04L 63/1425* (2013.01); *H04L 63/1416* (2013.01)
(58) Field of Classification Search
None
See application file for complete search history.

(56) References Cited

U.S. PATENT DOCUMENTS

2006/0168170 A1* 7/2006 Korzeniowski ..... H04L 41/0631
                                                         709/224
2019/0238918 A1* 8/2019 Patel ...................... H04L 67/55
                        (Continued)

FOREIGN PATENT DOCUMENTS

JP        2023-534502 A    8/2023
KR      10-1697189 B1    1/2017
                (Continued)

OTHER PUBLICATIONS

Office Action received in Korean Application No. 10-2023-0152071 dated May 2, 2025.

*Primary Examiner* — Younes Naji
(74) *Attorney, Agent, or Firm* — Knobbe, Martens, Olson & Bear, LLP

(57)         ABSTRACT

Proposed is a method for tracking a cyber-attack to be performed by a cyber-attack tracking device including a memory and a processor. The method may include determining a plurality of behavior events performed by network devices in one or more domains, and mapping the plurality of the behavior events onto metadata of preset standards. The method may also include generating relationship data indicating a relationship between behavior events mapped onto metadata designated as a preset group based on the metadata mapped onto the behavior events. The method may further include counting a number of behavior events related to a preset suspected behavior among behavior events having a relationship data same as a relationship data of a first behavior event to calculate score for the relationship data including the first behavior event.

11 Claims, 10 Drawing Sheets

10

(56) References Cited

U.S. PATENT DOCUMENTS

| | | | |
|---|---|---|---|
| 2022/0027215 A1* | 1/2022 | Chilamakuri | G06F 9/5027 |
| 2023/0139000 A1* | 5/2023 | Apger | G06F 3/0482 |
| | | | 726/1 |
| 2024/0045970 A1* | 2/2024 | Morita | G06F 21/554 |
| 2024/0414175 A1* | 12/2024 | Jiang | H04L 63/1425 |
| 2025/0111271 A1* | 4/2025 | Lee | G06N 20/00 |

FOREIGN PATENT DOCUMENTS

| | | | |
|---|---|---|---|
| KR | 10-2018-0051133 A | 5/2018 |
| KR | 10-2021-0137821 A | 11/2021 |
| KR | 10-2533101 B1 | 5/2023 |

* cited by examiner

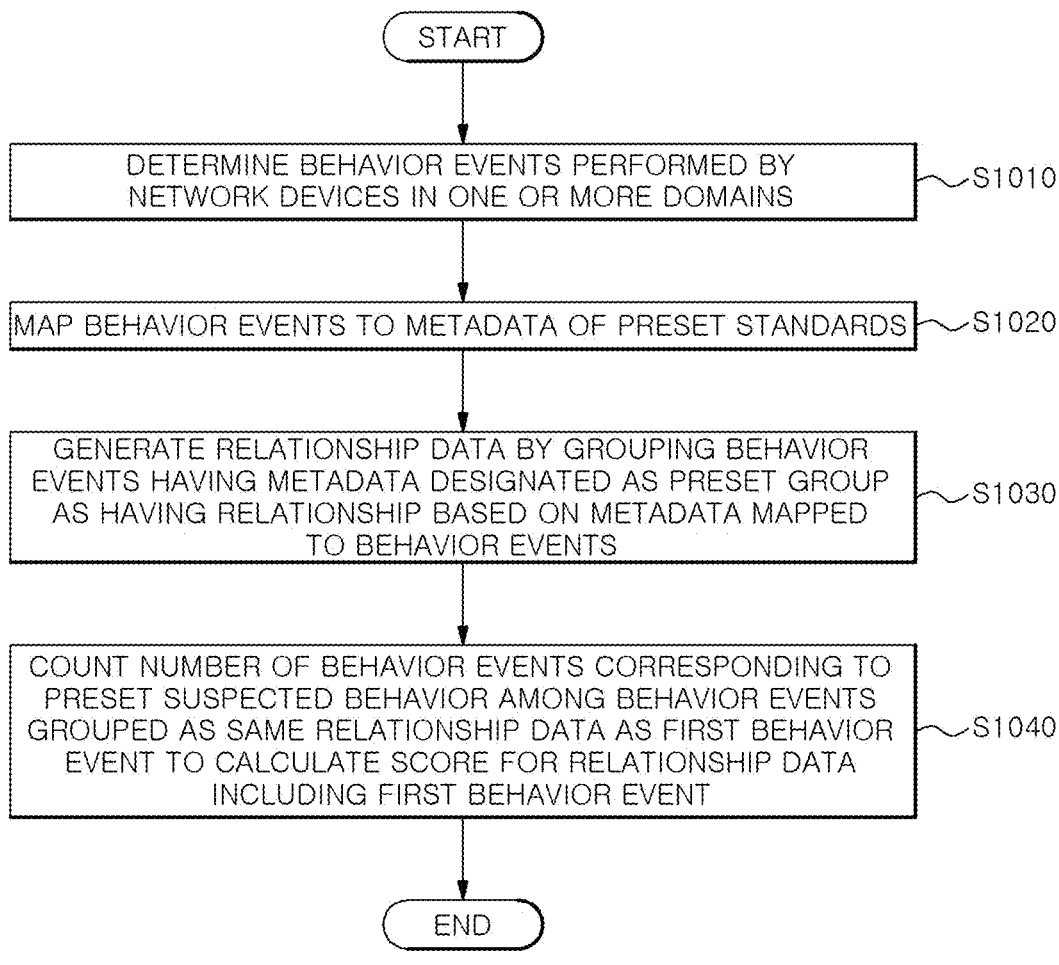

START

DETERMINE BEHAVIOR EVENTS PERFORMED BY NETWORK DEVICES IN ONE OR MORE DOMAINS ~S1010

MAP BEHAVIOR EVENTS TO METADATA OF PRESET STANDARDS ~S1020

GENERATE RELATIONSHIP DATA BY GROUPING BEHAVIOR EVENTS HAVING METADATA DESIGNATED AS PRESET GROUP AS HAVING RELATIONSHIP BASED ON METADATA MAPPED TO BEHAVIOR EVENTS ~S1030

COUNT NUMBER OF BEHAVIOR EVENTS CORRESPONDING TO PRESET SUSPECTED BEHAVIOR AMONG BEHAVIOR EVENTS GROUPED AS SAME RELATIONSHIP DATA AS FIRST BEHAVIOR EVENT TO CALCULATE SCORE FOR RELATIONSHIP DATA INCLUDING FIRST BEHAVIOR EVENT ~S1040

END

FIRST BEHAVIOR EVENT

FIG.9

CYBER-ATTACK TRACKING METHOD AND DEVICE USING BEHAVIOR EVENT-BASED RELATIONSHIP DATA COLLECTED FROM MULTIPLE DOMAINS, AND STORAGE MEDIUM STORING INSTRUCTIONS TO PERFORM CYBER-ATTACK TRACKING METHOD

CROSS-REFERENCE TO RELATED APPLICATION

This application claims priority to Korean Patent Application No. 10-2023-0152071 filed on Nov. 6, 2023, the entirety of which is incorporated herein by reference for all purposes.

TECHNICAL FIELD

The present disclosure relates to a method and device for tracking cyber-attacks using relationship data generated based on behavior events collected from one or more domains.

BACKGROUND

Most companies conduct breach investigations into cyber-attacks after they are internally aware of the damage caused by the cyber-attacks. However, recently, attackers carrying out cyber-attacks have been using various advanced technologies such as bypassing security systems and anti-forensics, which makes it difficult to secure data for investigation of breaches through long-term hidden attacks.

SUMMARY

According to an embodiment, technology for collecting behavior events from a large-scale host composed of one or more domains and a network and forming a causal relationship from behavior events at the initial stage to the current behavior events to identify an intra-host attach behavior and an inter-host attack behavior of an attacker is provided.

The aspects of the present disclosure are not limited to the foregoing, and other aspects not mentioned herein will be clearly understood by those skilled in the art from the following description.

In accordance with an aspect of the present disclosure, there is provided a method for tracking a cyber-attack to be performed by a cyber-attack tracking device including a memory and a processor, the method comprises: determining a plurality of behavior events performed by network devices in one or more domains; mapping the plurality of the behavior events onto metadata of preset standards; generating relationship data indicating a relationship between behavior events mapped onto metadata designated as a preset group based on the metadata mapped onto the behavior events; and counting a number of behavior events related to a preset suspected behavior among behavior events having a relationship data same as a relationship data of a first behavior event to calculate score for the relationship data including the first behavior event.

The determining the plurality of behavior events may include determining original data for each behavior event occurred in the network devices; detecting a preset suspected attack behavior in the original data; generating data relating to the preset suspected attack behavior; and generating behavior events including data relating to the preset suspected attack behavior.

The metadata may include at least one of information classified as an event type for the plurality of the behavior events, a process action for the plurality of the behavior events, a file specification for the plurality of the behavior events, a module characteristic for the plurality of the behavior events, a network characteristic for the plurality of the behavior events, and a registry information for the plurality of the behavior events.

The metadata may include: an event identification value specifying information on an event occurrence time, an event identification (ID), an event sequence, and an event group ID; an event unique value specifying information on a file name and a file path; and a suspected behavior value specifying information on attack tactics and attack techniques.

The generating relationship data may include generating intra-device relationship data indicating an internal-relationship between the plurality of behavior events occurred in each network device.

The generating intra-device relationship data may include generating the relationship data by grouping behavior events having metadata related to the same event group ID among behavior events having metadata related to a preset process action for the plurality of the behavior events.

The generating relationship data may include generating inter-device relationship data indicating an inter-relationships between the plurality of behavior events occurred in network devices.

The generating inter-device relationship data may include generating the inter-device relationship data by grouping behavior events including a port of a transmission network device same as a port of a reception network device among behavior events having metadata related to a preset network characteristic for the plurality of the behavior events and including a file name of a transmitted file same as a file name of a received file or a hash value of the transmitted file same as a hash value of the a received file.

The counting the number of behavior events related to the preset suspected behavior includes counting the number of duplicate behavior events as one when behavior events related to the preset suspected behavior occurs repeatedly among behavior events having the relationship data same as the first behavior event.

In accordance with another aspect of the present disclosure, there is provided a cyber-attack tracking device, the device comprises: a memory configured to store one or more instructions; and a processor configured to execute the one or more instructions stored in the memory, wherein the instructions, when executed by the processor, cause the processor to a plurality of behavior events performed by network devices in one or more domains, map the plurality of the behavior events onto metadata of preset standards, generate relationship data indicating a relationship between behavior events mapped onto metadata designated as a preset group based on the metadata mapped onto the behavior events, and count a number of behavior events related to a preset suspected behavior among behavior events having a relationship data same as a relationship data of a first behavior event to calculate score for the relationship data including the first behavior event.

In accordance with another aspect of the present disclosure, there is provided a, which comprises instructions for a processor to perform a perform a cyber-attack tracking method, the method comprise: determining a plurality of behavior events performed by network devices in one or more domains; mapping the plurality of the behavior events onto metadata of preset standards; generating relationship data indicating a relationship between behavior events mapped onto metadata designated as a preset group as having a relationship based on the metadata mapped onto the behavior events; and counting a number of behavior events related to a preset suspected behavior among behavior events having a relationship data same as relationship data of a first behavior event to calculate score for the relationship data including the first behavior event.

According to an embodiment, in order to prevent advanced cyber-attacks, relationship data for efficiently tracking cyber-attacks can be generated by collecting host behavior events in real time from one or more domains and systematically converting the collected behavior events into data. The present disclosure can systematically identify and analyze event paths from the initial stage of a cyber-attack to the present through such relationship data.

Accordingly, the present disclosure can identify event paths from the initial point in time of an attack that has infiltrated a company to the present in an infringement investigation analysis stage and provide a causal relationship of attacks in large-scale behavior events, thereby reducing the efforts of investigation analysts and dependence on a limited number of professional analysts.

BRIEF DESCRIPTION OF THE DRAWINGS

FIG. 3 is a flowchart of an operation performed by the cyber-attack tracking device according to an embodiment.

FIG. 9 is a diagram illustrating behavior events corresponding to a preset suspected behavior among behavior events grouped as the same relationship data as the first behavior event according to an embodiment.

DETAILED DESCRIPTION

Figure 1:
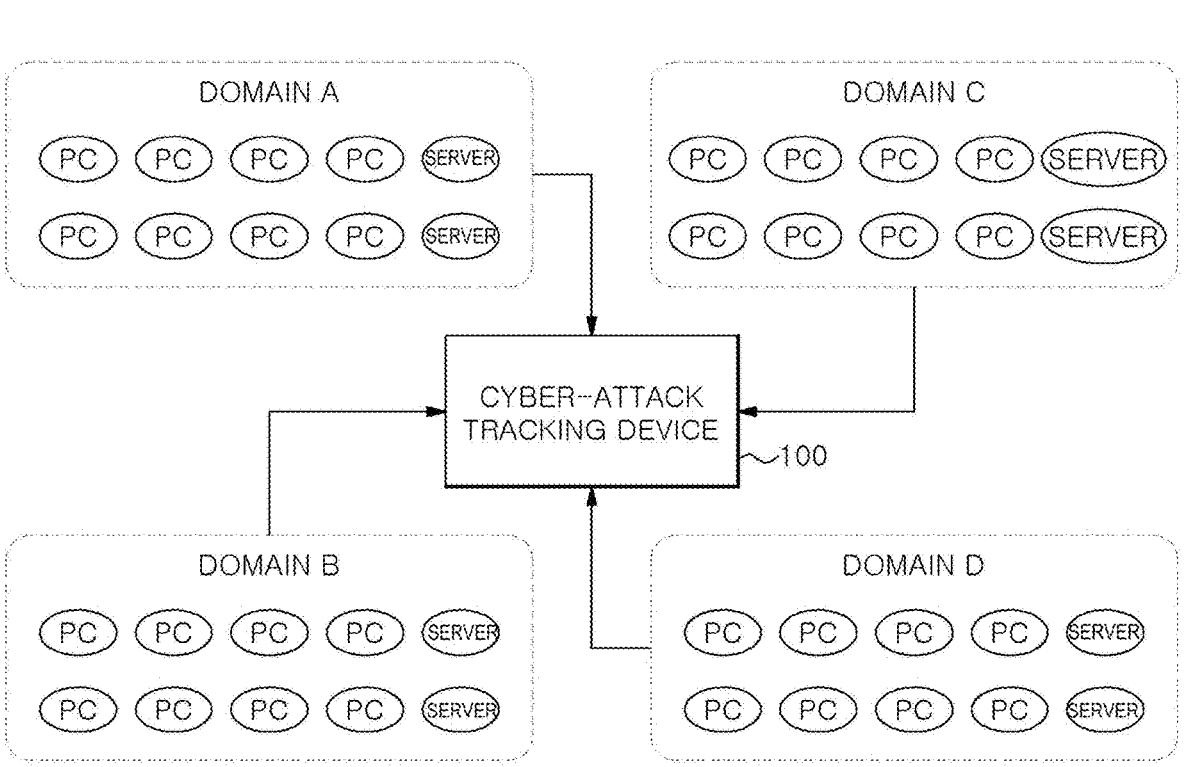
FIG. 1 is a configuration diagram of a cyber-attack tracking system according to an embodiment.

In order to overcome such advanced cyber-attacks, it is necessary to collect and systematically store behavior events of all hosts within a company in real time for a long period of time to systematically identify and analyze event paths from the initial stage of an attack that has penetrated the company to the present according to the zero trust concept.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a configuration diagram of a cyber-attack tracking system 10 according to an embodiment.

Referring to FIG. 1, the cyber-attack tracking system according to an embodiment may include a cyber-attack tracking device 100 and one or more domains (e.g., domain A, domain B, domain C, and domain D).

The cyber-attack tracking device 100 may collect host log information from one or more domains and create a data structure capable of detecting a cyber-attack in advance on the basis of the collected log information. The cyber-attack tracking device 100 can identify event paths from the initial stage of a cyber-attack to the present and analyze the causal relationship of the attack behavior on the basis of such a data structure.

A domain may include a set of hosts connected through a predetermined network. Here, a host is a computing device capable of communication and may include, for example, a "server" and a "client PC". Domains (e.g., domain A, domain B, domain C, and domain D) may be independent networks or networks that can interact with each other, and the host of each domain can generate log information including information on a specific event when the host performs the specific event.

Figure 2:
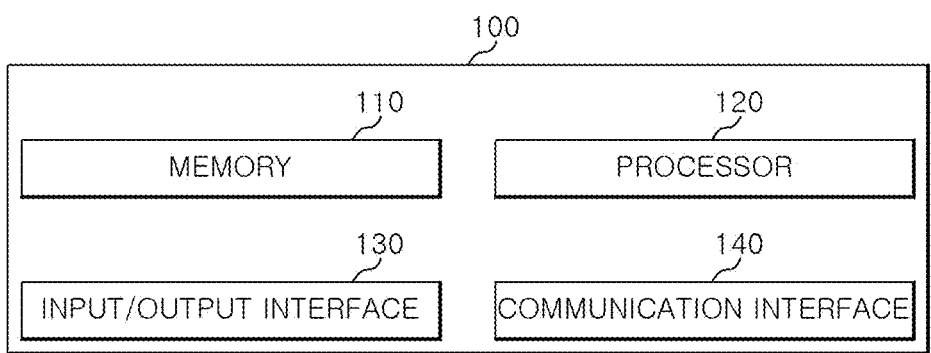
FIG. 2 is a configuration diagram of a cyber-attack tracking device according to an embodiment.

FIG. 2 is a configuration diagram of the cyber-attack tracking device 100 (hereinafter referred to as a "device 100") according to an embodiment.

Referring to FIG. 2, the device 100 according to an embodiment may include a memory 110, a processor 120, an input/output interface 130, and a communication interface 140.

The memory 110 may store data acquired from external devices or data generated by itself. The memory 110 may store instructions for performing operations of the processor 120. For example, the memory 110 may store host log information obtained from one or more domains or may obtain a DB containing log information from an external device.

The processor 120 is a computing device that controls overall operations. The processor 120 can execute instructions stored in the memory 110. The operation of the device 100 according to the embodiments of the present disclosure may be understood as an operation performed by the processor 120.

The input/output interface 130 may include a hardware interface or a software interface through which information is input and output.

The communication interface 140 allows information to be transmitted and received through a communication network. To this end, the communication interface 140 may include a wireless communication module or a wired communication module.

The device 100 may be implemented as various types of devices capable of performing computations through the processor 120 and transmitting and receiving information through a network. For example, the device 100 may be implemented in the form of a computer device, a portable communication device, a smartphone, a portable multimedia device, a laptop computer, a tablet PC, or the like, but is not limited to these examples.

FIG. 3 is a flowchart of the operation performed by the device 100 according to an embodiment. The operation of the device 100 according to the embodiment of FIG. 3 may be understood as an operation performed by the processor 120. Each step disclosed in FIG. 3 is merely a preferred embodiment in achieving the object of the present disclosure, and some steps may be added or deleted as needed and one step may be included in another step. The order of the steps disclosed in FIG. 3 is merely an order arranged for convenience of understanding, and this order is not limited to a time-serial order and may be changed differently according to designer's selection.

Referring to FIG. 3, the device 100 may obtain behavior events performed by hosts in one or more domains in step S1010. For example, the device 100 may directly generate behavior events from original data including a log performed by a host, or obtain behavior events generated by hosts in domains. An embodiment of generating a behavior event may include the example shown in FIG. 4 below.

Figure 4:
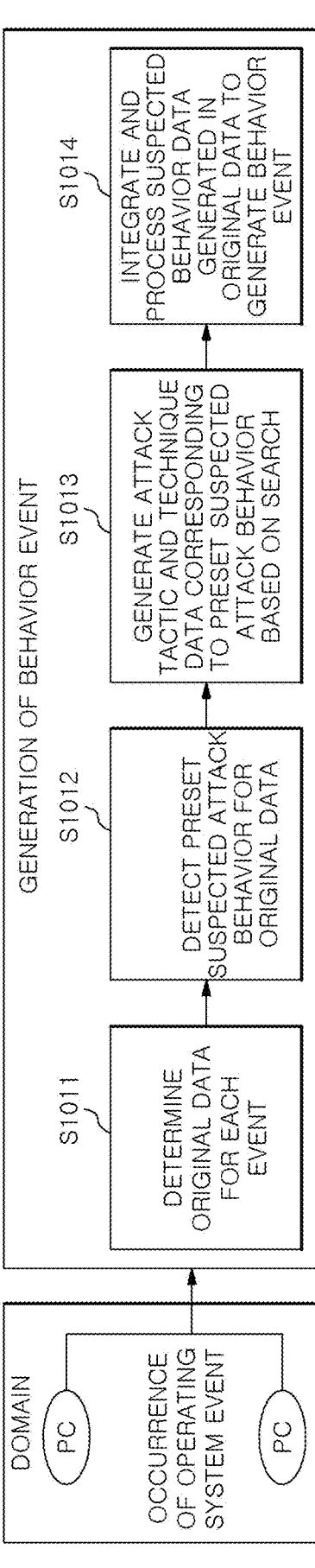
FIG. 4 is a diagram illustrating an operation of generating a behavior event according to an embodiment.

FIG. 4 is a diagram illustrating the operation of generating a behavior event according to an embodiment. Each step disclosed in FIG. 4 is merely a preferred embodiment in achieving the object of the present disclosure, and some steps may be added or deleted as needed and one step may be included in another step. The order of the steps disclosed in FIG. 4 is merely an order arranged for convenience of understanding, and this order is not limited to a time-serial order and may be changed differently according to designer's selection.

Referring to FIG. 4, the device 100 may obtain original data regarding an event that has occurred in a host of a specific domain in step S1011. For example, the original data may include a log file regarding an action of the host.

In step S1012, the device 100 may check whether the original data corresponds to a preset suspected attack on the basis of the original data. For example, the device 100 may store information corresponding to suspected attacks in advance and compare the stored information with the original data of a host to search for data corresponding to a suspected attack among the original data.

In step S1013, the device 100 may generate suspected behavior data including attack tactics and techniques corresponding to preset suspected attacks on the basis of the search result of S1012.

In step S1014, the device 100 may process the suspected behavior data generated in step S1013 and the original data to determine and obtain host behavior events to be collected by the device 100.

Referring back to FIG. 3, the device 100 may map metadata to the behavior events in step S1020. The metadata may include information for identifying the behavior events and may be stored according to preset standards or order, as shown in the examples of FIGS. 5 and 6 below.

Figure 5:
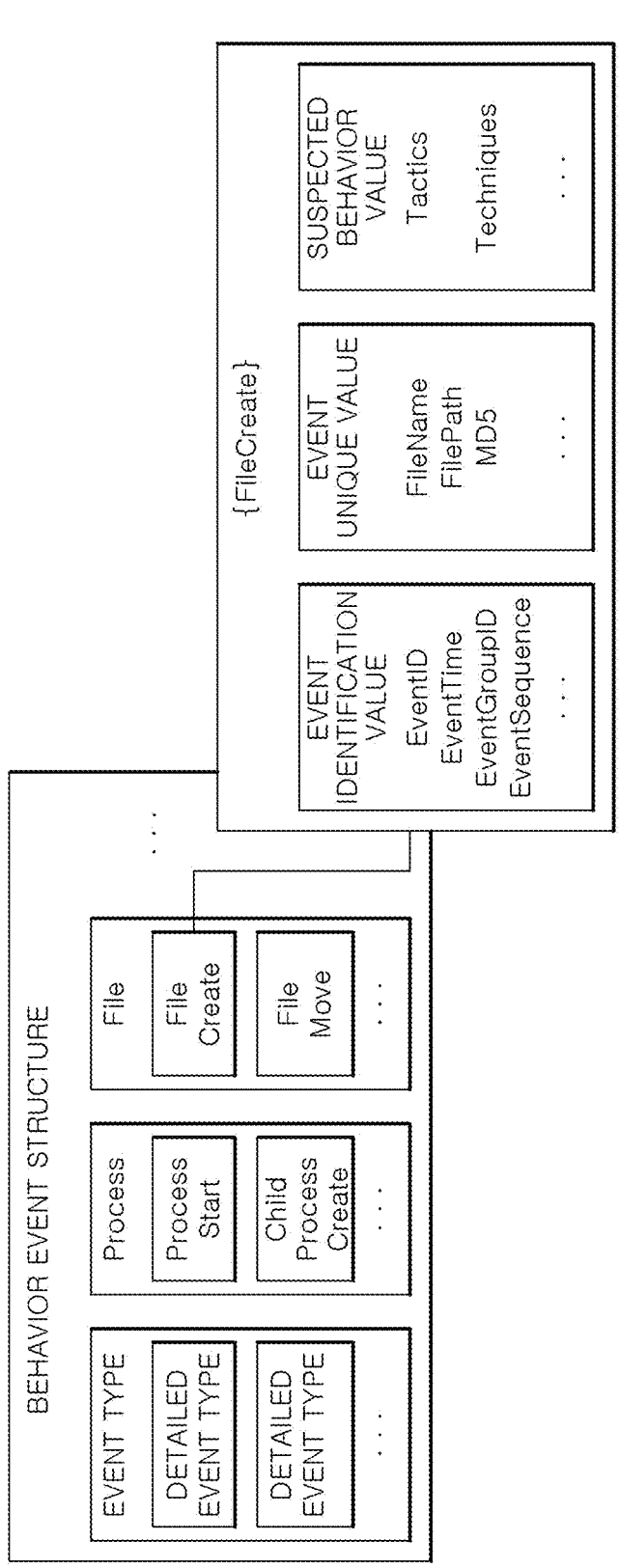
FIG. 5 is a diagram illustrating metadata mapped to a behavior event according to preset standards according to an embodiment.
Figure 6:
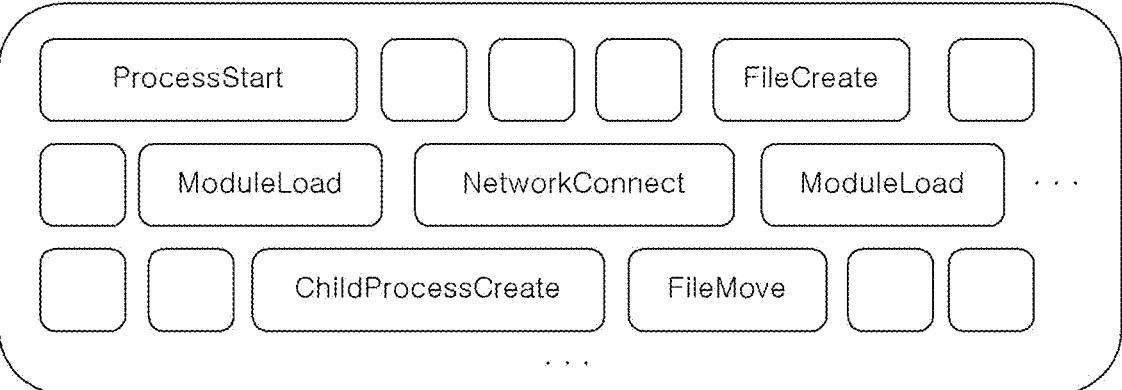
FIG. 6 is a diagram for describing that metadata can be stored in the form of data stored in a preset order with respect to a specific behavior event according to an embodiment.

FIG. 5 is a diagram illustrating metadata mapped to a behavior event according to preset standards according to an embodiment.

Referring to FIG. 5, the first metadata of the behavior event may include at least one piece of information classified as an event type, a process, a file, a module, a network, and a registry with respect to the behavior event.

Additionally, each piece of the first metadata may further include second metadata information including specific information on an item. For example, a first metadata item with respect to "event type" may further include second metadata regarding "detailed event type". For example, a first metadata item regarding "process" may further include second metadata regarding a processor order, such as "process start, child process creation, . . . ". For example, a first metadata item regarding "file" may further include second metadata regarding an order of information processed with respect to a file, such as "file create, file move, . . . ".

Further, each piece of second metadata may further include third metadata classified into an event identification value, an event unique value, and a suspected behavior value. For example, a second metadata item regarding "event identification value" may further include third metadata regarding "event ID, event occurrence time, event group ID, and event sequence". For example, a second metadata item regarding "event unique value" may further include third metadata regarding "file name, file path, encryption information (e.g., MD5)". For example, a second metadata item regarding "suspected behavior value" may further include third metadata regarding "attack tactics and attack techniques".

FIG. 6 is a diagram for describing that metadata can be stored in the form of data stored in a preset order with respect to a specific behavior event according to an embodiment.

Referring to FIG. 6, the device 100 may generate data by arranging metadata (e.g., first metadata, second metadata, and third metadata) generated as in the example of FIG. 5 in a preset order, and then map the data to a specific behavior event and store the same.

Referring back to FIG. 3, the device 100 generates relationship data by grouping behavior events having metadata designated as a preset group as having a relationship on the basis of the metadata mapped to the behavior events in step S1030.

As an example, the device 100 may generate intra-host relationship data by grouping behavior events representing the internal relationship of one host, or generate inter-host relationship data by grouping behavior events representing relationships between a plurality of hosts.

Figure 7B:
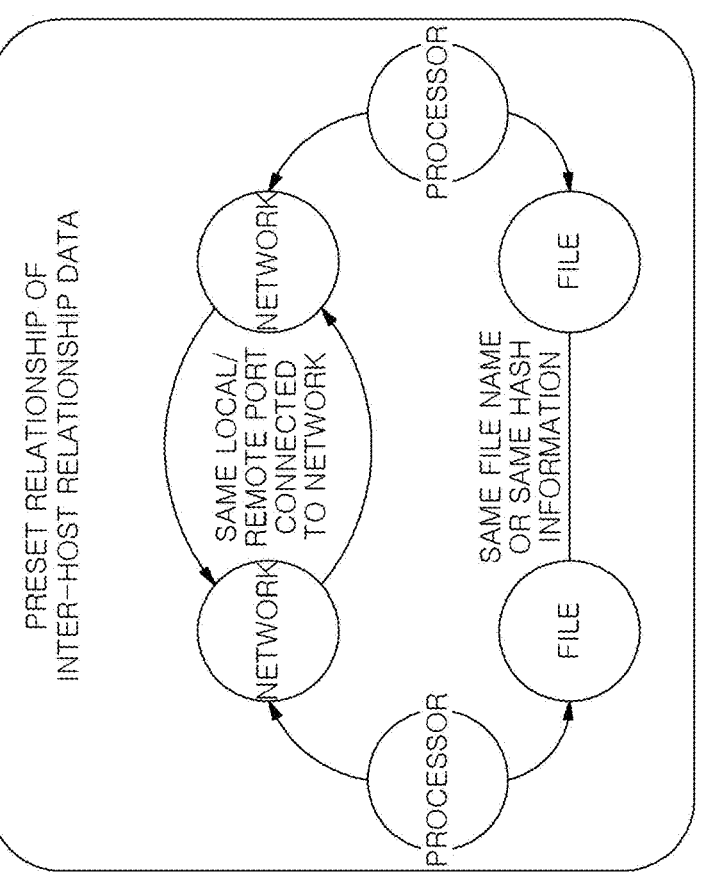
FIG. 7B is a diagram illustrating an embodiment of generating relationship data specifying a relationship between hosts by grouping behavior events representing relationships between a plurality of hosts according to an embodiment.
Figure 7A:
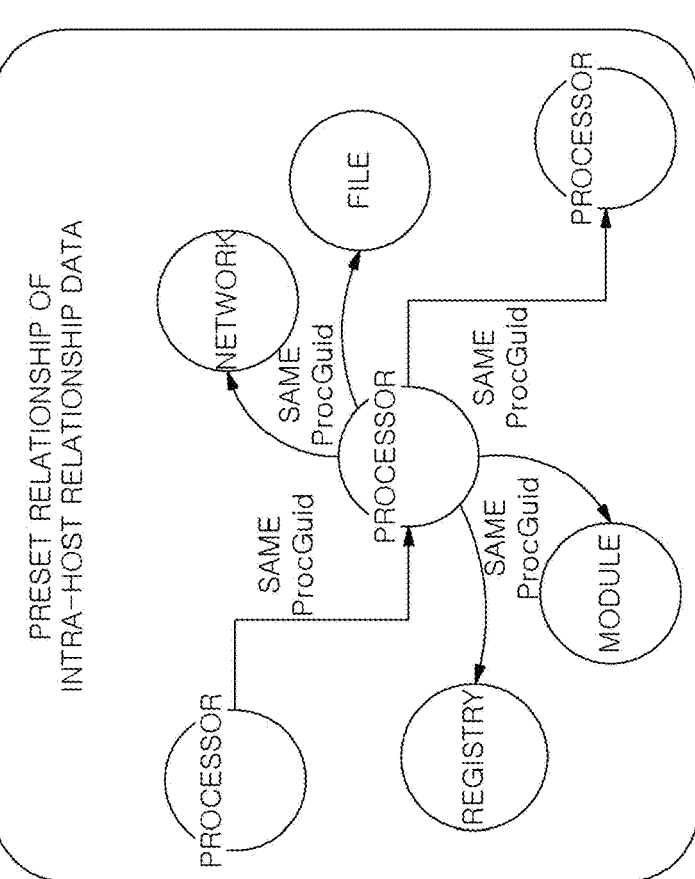
FIG. 7A is a diagram illustrating an embodiment of generating relationship data specifying the inside of a host by grouping behavior events representing the internal relationship of one host according to an embodiment.

FIG. 7A is a diagram illustrating an embodiment of generating relationship data specifying the inside of a host by grouping behavior events representing the internal relationship of one host according to an embodiment.

FIG. 7B is a diagram illustrating an embodiment of generating relationship data specifying a relationship between hosts by grouping behavior events representing relationships between a plurality of hosts according to an embodiment.

Referring to FIG. 7A, the device 100 may group behavior events having metadata with a "same event group ID" among behavior events having metadata corresponding to "preset process" and generate a set of the grouped behavior events as relational data.

Referring to FIG. 7B, the device 100 may group behavior events in which file names of a transmitted file behavior event and a received file behavior event have the same value or hash information has the same value with the same network port between a transmission host and a reception host among behavior events having metadata corresponding to "preset network" and generate a set of the grouped behavior events as relationship data.

Referring back to FIG. 3, in step S1040, the device 100 may count behavior events corresponding to a preset suspected behavior among behavior events grouped as the same relationship data as a specific behavior event (hereinafter referred to as a "first behavior event") to perform scoring on the relationship data including the first behavior event. Here, scoring may indicate the possibility of the relationship corresponding to a cyber-attack.

Figure 8:
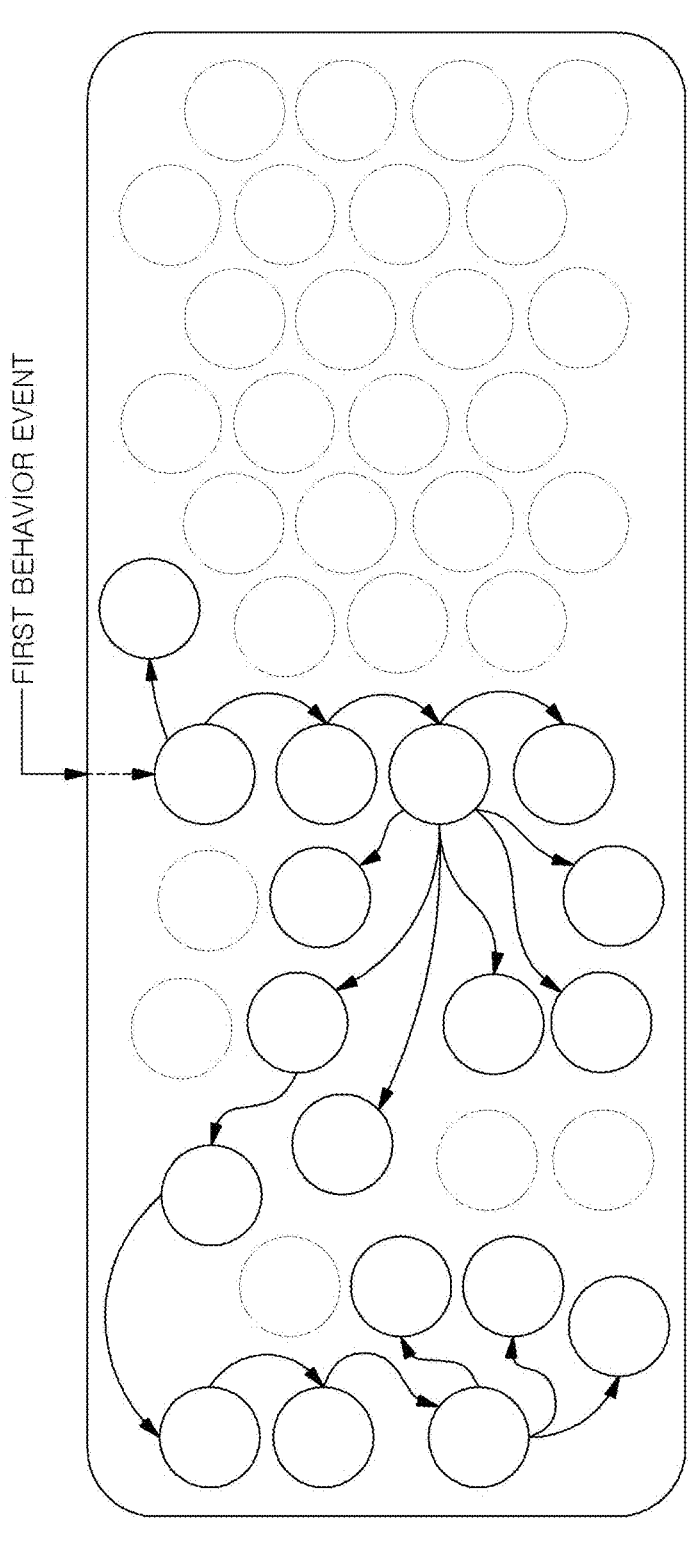
FIG. 8 is a diagram illustrating behavior events grouped as the same relationship data as a first behavior event according to an embodiment.
Figure 9:
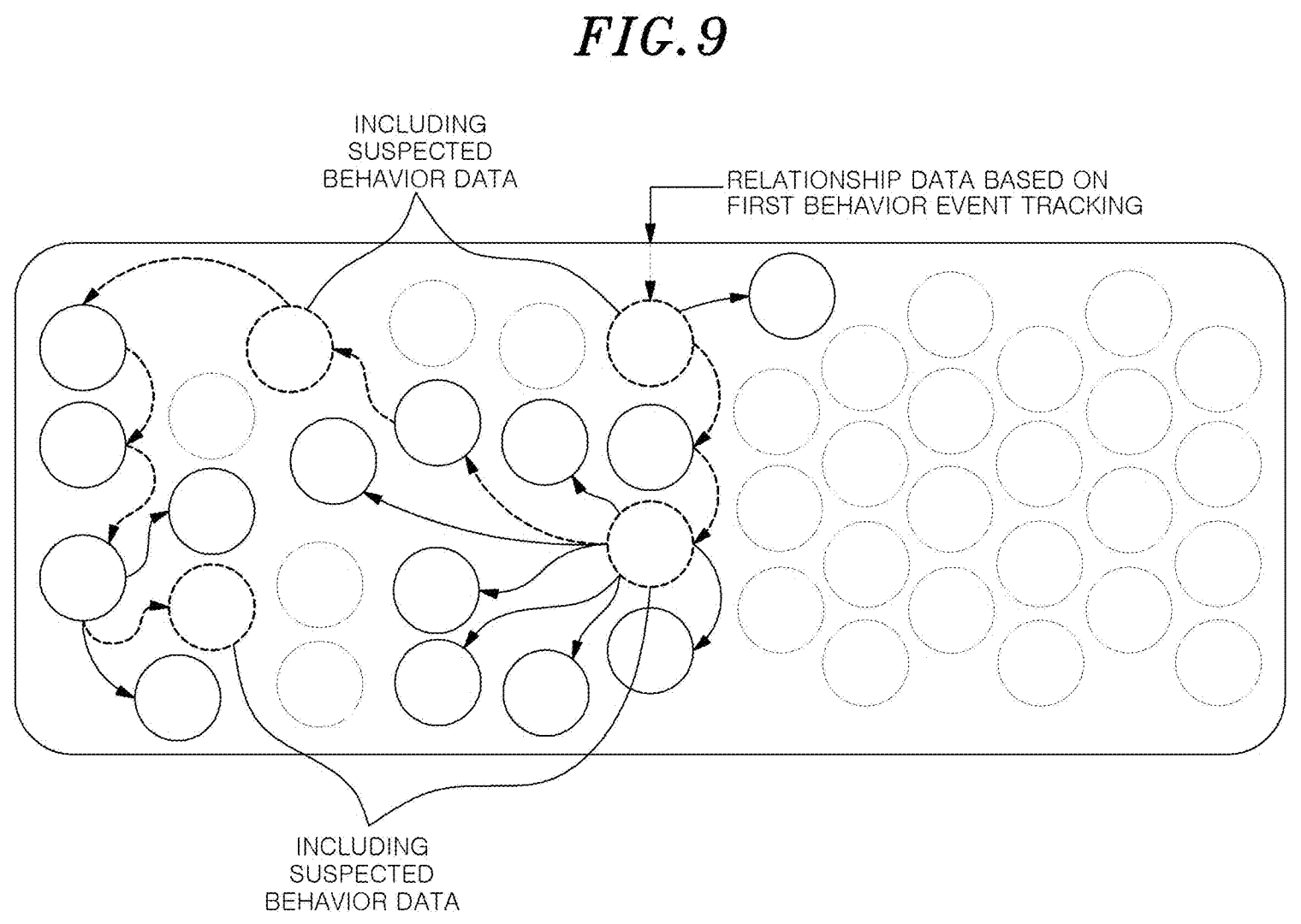

FIG. 8 is a diagram illustrating behavior events grouped as the same relationship data as a first behavior event according to an embodiment. FIG. 9 is a diagram illustrating behavior events (dotted line nodes in FIG. 9) corresponding to a preset suspected behavior among behavior events grouped as the same relationship data as the first behavior event according to an embodiment. According to the examples shown in FIGS. 8 and 9, relationship data may be created in a graph structure in which the relationship data has information on one behavior event as node information and has information on the order of occurrence of behavior events or information on a preset relationship between behavior events as trunk information.

Referring to FIGS. 8 and 9, the device 100 may count the number of nodes corresponding to a preset suspected behavior by determining whether a behavior event stored in each node corresponds to the preset suspected behavior while passing node information according to the trunk information starting from the "first behavior event" to be observed by a user.

Figure 10:
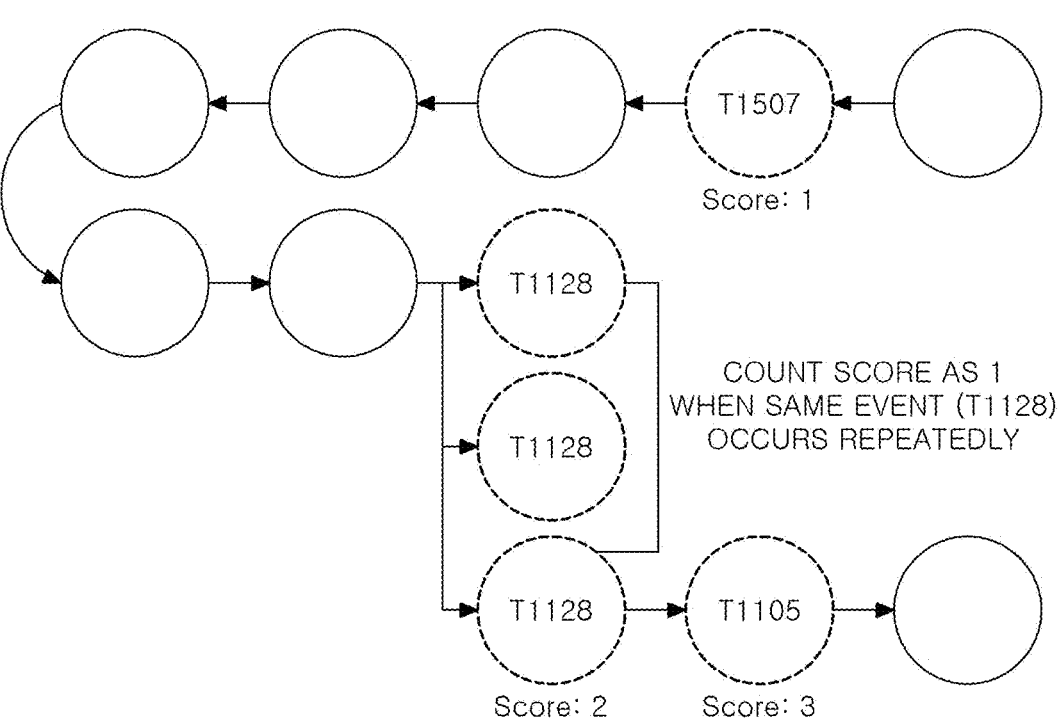
FIG. 10 is a diagram illustrating scoring of duplicate behavior events in a case where preset suspected behaviors are counted on the basis of relationship data in a graph structure according to an embodiment.

FIG. 10 is a diagram illustrating scoring of duplicate behavior events in a case where preset suspected behaviors are counted on the basis of relationship data in a graph structure according to an embodiment.

Referring to FIG. 10, in a case where a preset suspected behavior among behavior events grouped as the same relationship data as the first behavior event has occurred multiple times (e.g., T1128 has occurred 3 times in FIG. 10), the device 100 may count the number of duplicate behavior events as one (e.g., the number of occurrences of T1128 in FIG. 10 is counted as one). This is because duplicate behavior events occur because a large amount of identical suspected behavior information may occur depending on the process execution characteristics. In the relationship data of FIG. 10, assuming that dotted line nodes in FIG. 10 are nodes determined as suspected behavior information, the device 100 can count a total of three suspected attack nodes (=behavior events) of "T1507 once+T1128 once+T1105 once".

According to S1040, the device 100 can sort relationship data in descending order of scoring scores and provide information on the domain, host, and behavior events included in the relationship data corresponding to the highest score to the user. The user can analyze the behavior events included in the provided relationship data to respond to cyber-attacks in advance and analyze causal relationships between behavior events.

According to the above-described embodiment, in order to prevent advanced cyber-attacks, it is possible generate relationship data for efficiently tracking cyber-attacks by collecting behavior events of hosts from one or more domains in real time and systematically converting the collected behavior events into data. The present disclosure can systematically identify and analyze event paths from the initial stage of a cyber-attack to the present through such relationship data. Accordingly, the present invention can identify event paths from the initial point in time of an attack that has infiltrated a company to the present in an infringement investigation analysis stage and provide causal relationships of attacks in large-scale behavior events, thereby reducing the efforts of investigation analysts and dependence on a limited number of professional analysts.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for tracking a cyber-attack to be performed by a cyber-attack tracking device including a memory and a processor, the method comprising:
   determining a plurality of behavior events performed by network devices in one or more domains by:
      determining original data for each behavior event that occurred in the network devices,
      detecting a preset suspected attack behavior in the original data,
      generating data related to the preset suspected attack behavior, and
      generating behavior events comprising the data related to the preset suspected attack behavior, wherein the generating the data, the generating the behavior events, and the detecting the preset suspected attack behavior are performed by the processor to improve an efficiency of cyber-attack detection;
   mapping the plurality of behavior events onto metadata of preset standards, wherein the metadata includes at least one of information classified as an event type, a process action, a file specification, a module characteristic, a network characteristic, or registry information for the plurality of behavior events, wherein mapping the plurality of behavior events onto metadata enables systematic identification and analysis of network activity;
   generating relationship data indicating a relationship between behavior events mapped onto metadata designated as a preset group based on the metadata mapped onto the plurality of behavior events to systematically identify and analyze event paths from an initial stage of the cyber-attack to current behavior events to identify an intra-host attack behavior and an inter-host attack behavior of an attacker through the relationship data; and
   counting a number of behavior events related to a preset suspected behavior among behavior events having the same relationship data as a first behavior event to calculate a score for the relationship data including the first behavior event to prioritize potential threats in real-time; and
   providing a user terminal with the relationship data sorted in descending order of calculated scores and information on a domain, host, and behavior events included in the relationship data corresponding to a highest score, wherein a user of the user terminal is enabled to analyze the behavior events included in the provided relationship data to respond to cyber-attacks in advance and analyze causal relationships between behavior events to prevent advanced cyber-attacks,
   wherein generating the relationship data includes generating inter-device relationship data indicating an inter-relationships between the plurality of behavior events occurred in network devices, and
   wherein generating the inter-device relationship data includes generating the inter-device relationship data by grouping behavior events including a port of a transmission network device same as a port of a reception network device among behavior events having metadata related to a preset network characteristic for the plurality of the behavior events and including a file name of a transmitted file same as a file name of a received file or a hash value of the transmitted file same as a hash value of the received file.

2. The method of claim 1, wherein the metadata of the preset standards includes:
   an event identification value specifying information on an event occurrence time, an event identification (ID), an event sequence, and an event group ID;
   an event unique value specifying information on a file name and a file path; and
   a suspected behavior value specifying information on attack tactics and attack techniques.

3. The method of claim 1, wherein generating the relationship data includes generating intra-device relationship data indicating an internal-relationship between the plurality of behavior events occurred in each network device.

4. The method of claim 3, wherein generating the intra-device relationship data includes generating the relationship data by grouping behavior events having metadata related to the same event group ID among behavior events having metadata related to a preset process action for the plurality of the behavior events.

5. The method of claim 1, wherein counting the number of behavior events related to the preset suspected behavior includes counting the number of duplicate behavior events as one when behavior events related to the preset suspected behavior occurs repeatedly among behavior events having the relationship data same as the first behavior event.

6. A non-transitory computer readable storage medium storing computer executable instructions that cause, when executed by one or more processors, the one or more processors to perform the method of claim 1.

7. A cyber-attack tracking device comprising:
   a memory configured to store one or more instructions; and
   a processor configured to execute the one or more instructions to:
      determine a plurality of behavior events performed by network devices in one or more domains by:
         determining original data for each behavior event that occurred in the network devices,
         detecting a preset suspected attack behavior in the original data, generating data related to the preset suspected attack behavior, and generating behavior events comprising the data related to the preset suspected attack behavior, wherein the generating the data, the generating the behavior events, and the detecting the preset suspected attack behavior are performed by the processor to improve an efficiency of cyber-attack detection;

map the plurality of the behavior events onto metadata of preset standards, wherein the metadata includes at least one of information classified as an event type, a process action, a file specification, a module characteristic, a network characteristic, or registry information for the plurality of behavior events, wherein mapping the plurality of behavior events onto metadata enables systematic identification and analysis of network activity;

generate relationship data indicating a relationship between behavior events mapped onto metadata designated as a preset group based on the metadata mapped onto the plurality of behavior events to systematically identify and analyze event paths from an initial stage of a cyber-attack to current behavior events to identify an intra-host attack behavior and an inter-host attack behavior of an attacker through the relationship data;

count a number of behavior events related to a preset suspected behavior among behavior events having the same relationship data as a first behavior event to calculate score for the relationship data including the first behavior event to prioritize potential threats in real-time; and provide a user terminal with the relationship data sorted in descending order of calculated scores and information on a domain, host, and behavior events included in the relationship data corresponding to a highest score, wherein a user of the user terminal is enabled to analyze the behavior events included in the provided relationship data to respond to cyber-attacks in advance and analyze causal relationships between behavior events to prevent advanced cyber-attacks, wherein to generate the relationship data, the processor is configured to generate inter-device relationship data indicating an inter-relationships between the plurality of behavior events occurred in network devices, and wherein to generate the inter-device relationship data, the processor is configured to generate the inter-device relationship data by grouping behavior events including a port of a transmission network device same as a port of a reception network device among behavior events having metadata related to a preset network characteristic for the plurality of the behavior events and including a file name of a transmitted file same as a file name of a received file or a hash value of the transmitted file same as a hash value of the received file.

8. The cyber-attack tracking device of claim 7, wherein the metadata of the preset standards includes:

an event identification value specifying information on an event occurrence time, an event identification (ID), an event sequence, and an event group ID;

an event unique value specifying information on a file name and a file path; and a suspected behavior value specifying information on attack tactics and attack techniques.

9. The cyber-attack tracking device of claim 7, wherein the processor is configured to generate intra-device relationship data indicating an internal-relationship between the plurality of behavior events occurred in each network device.

10. The cyber-attack tracking device of claim 9, wherein the processor is configured to generate the relationship data by grouping behavior events having metadata related to the same event group ID among behavior events having metadata related to a preset process action for the plurality of the behavior events.

11. The cyber-attack tracking device of claim 7, wherein the processor is configured to count the number of duplicate behavior events as one when behavior events related to the preset suspected behavior occurs repeatedly among behavior events having the relationship data same as the first behavior event.

* * * * *